(12) United States Patent
Stoppe et al.

(10) Patent No.: US 10,866,401 B2
(45) Date of Patent: Dec. 15, 2020

(54) METHOD FOR REFLECTION CORRECTION OF IMAGES AND DEVICES IN THIS REGARD

(71) Applicant: Carl Zeiss Microscopy GmbH, Jena (DE)

(72) Inventors: Lars Stoppe, Jena (DE); Thomas Milde, Nausnitz (DE); Johannes Winterot, Jena (DE)

(73) Assignee: Carl Zeiss Microscopy GMBH, Jena (DE)

(*) Notice: Subject to any disclaimer, the term of this patent is extended or adjusted under 35 U.S.C. 154(b) by 61 days.

(21) Appl. No.: 15/142,498

(22) Filed: Apr. 29, 2016

(65) Prior Publication Data

US 2016/0320604 A1 Nov. 3, 2016

(30) Foreign Application Priority Data

Apr. 30, 2015 (DE) .................. 10 2015 208 080

(51) Int. Cl.
*G02B 21/06* (2006.01)
*G02B 21/36* (2006.01)
*G06T 5/50* (2006.01)
*G06T 5/00* (2006.01)

(52) U.S. Cl.
CPC .......... *G02B 21/367* (2013.01); *G02B 21/06* (2013.01); *G06T 5/001* (2013.01); *G06T 5/50* (2013.01); *G06T 2207/10056* (2013.01); *G06T 2207/10152* (2013.01); *G06T 2207/20224* (2013.01)

(58) Field of Classification Search
CPC ...... G02B 21/06; G02B 21/367; G06T 5/001; G06T 2207/20224; G06T 5/50; G06T 2207/10056; G06T 2207/10152
See application file for complete search history.

(56) References Cited

U.S. PATENT DOCUMENTS

| | | | | |
|---|---|---|---|---|
| 6,088,612 A | * | 7/2000 | Blair | A61B 1/00048 250/559.05 |
| 2004/0190132 A1 | * | 9/2004 | Laschke | G02B 21/06 359/385 |
| 2006/0098895 A1 | * | 5/2006 | Westphal | G02B 21/125 382/274 |
| 2010/0108873 A1 | * | 5/2010 | Schwertner | G01B 11/2504 250/252.1 |

* cited by examiner

*Primary Examiner* — Dave Czekaj
*Assistant Examiner* — Berteau Joisil
(74) *Attorney, Agent, or Firm* — Nixon Peabody LLP; Jeffrey L. Costellia

(57) ABSTRACT

The invention relates to a reflection correction method for correcting digital microscopic images. Here, the reflection correction method comprises: illuminating an object, the illuminating of the object having at least two illumination patterns. Creating an illumination pattern image of the object for each illumination pattern. Calculating at least one partial reflection image, in each case by means of a combination of corresponding two illumination pattern images. Calculating a reflection-corrected image of the object by means of a suitable combination of at least one illumination pattern image and at least one partial reflection image. And, in this case, each illumination pattern as at least one active illumination source, and each illumination pattern is different from all others. Furthermore, the invention relates to an associated reflection-correcting device.

12 Claims, 5 Drawing Sheets

METHOD FOR REFLECTION CORRECTION OF IMAGES AND DEVICES IN THIS REGARD

The present invention relates to a method for reflection correction of an image of an object, preferably a digital microscopic image, and to devices in this regard.

Unwanted reflections may occur when recording an image by an optical system with illumination, which reflections are caused by the interaction between illumination, object and system and which impair the image recording or the image impression. Important details in the image may be lost as a result of such reflections. These reflections may have two different causes: firstly, an image reflection which occurs as a result of multiple reflections within the optical system (system reflections) and, secondly, an image reflection as a result of high reflectivity of the object to be examined in specific directions, in particular in the case of reflected-light illumination.

System reflections are currently generally corrected by means of special antireflection coatings on the critical optical surfaces within the system. Furthermore, special optical designs with increased complexity are installed in order to reduce system reflections. Furthermore, there can also be matting (black) of all parts not relevant to the imaging. Moreover, use can also be made of polarization-optical antireflection apparatuses. However, all of these measures require increased outlay during the production and can therefore be cost intensive.

Attempts are often made to correct occurring reflections digitally by means of image postprocessing, for example by way of compensating an increase of a brightness difference in an image part of the imaged object or by way of the reflection nature of the object being modelled by means of mathematical models and an attempt being made to remove the reflections obtained thereby from the image by calculation. A disadvantage of these postprocessing methods is that they can remove reflections occurring in the image to a great extent only in special cases. A further disadvantage here can be that the imaged object can be falsified in the process. Moreover, retrospective image-processing methods are time-consuming and computationally intensive.

Therefore, it would be desirable to provide an option allowing the removal of reflections, occurring in an optical instrument, for example in a digital microscope, as a result of illuminating the object, from the microscopic recording in a quick and more reliable manner.

It is an object of the invention to propose an option which avoids or at least reduces at least some of the disadvantages known from the prior art.

According to the invention, the object is achieved by means of a method according to the main claim and by means of devices according to the coordinate claims.

Here, the subject matter of the main claim relates to a reflection correction method for correcting images, preferably microscopic images.

The microscopic images can be obtained by various known microscopic methods. The method according to the invention is applicable in a particularly advantageous manner in digital microscopy since various image processing techniques and algorithms are used here in any case.

Here, the reflection correction method comprises:
- illuminating an object with at least two different illumination patterns, each illumination pattern having at least one active illumination source;
- creating an illumination pattern image of the object for each illumination pattern;
- calculating at least one partial reflection image by combining two illumination pattern images;
- calculating a reflection-corrected image of the object by means of a suitable combination of at least some of all illumination pattern images and at least some of all partial reflection images.

The method steps can be carried out in an automated manner. Advantageously, the method steps are worked through so quickly in the "live" mode of the microscope that the user observes virtually the live image without having to wait for the correction steps. Recording the illumination pattern images and processing in the hardware (optical engine) of the microscope to form the reflection-corrected image therefore takes place at a substantially higher rate than the reproduction of the "live" image.

Here, an illumination pattern within the meaning of the invention can be the targeted activation of one or more illumination sources for illuminating the object in order to create a corresponding illumination pattern image of the object. By way of example, an illumination pattern can be the illumination of the object by means of a first illumination source, whereas a second illumination pattern illuminates the object by means of one or more other illumination sources. In the case of an LED ring light, as is often used in microscopy for dark field reflected-light illumination, such illumination patterns can be generated easily by the targeted actuation of individual LEDs or a plurality of LEDs of the ring light. Thus, an illumination pattern is understood to be a defined arrangement or switching of different illumination sources. The illumination pattern itself can be formed, for example, by a matrix of illumination sources, with different ones of the illumination sources of the matrix being switched on for each illumination pattern. Here, depending on the design of the matrix and the allowed number of illumination sources simultaneously switched on, a number of different illumination patterns, to be established by combinatorics, can be generated.

Here, an illumination pattern image within the meaning of the invention is an optical digital recording of an object (image), wherein the object was illuminated by means of an illumination pattern.

Here, a partial reflection image within the meaning of the invention is an image which is created by virtue of two suitable illumination pattern images being combined with one another. In general, suitable illumination patterns are those which are geometrically "adjacent". The selection is made in accordance with this adjacency definition. The illumination pattern images are combined in such a way that the reflections which are present in both illumination pattern images remain whereas those image portions which do not have reflections cancel one another out. To this end, the absolute value of the difference of the individual images is formed. Reflections will migrate due to the surface properties, whereas the actual object remains unchanged.

Here, a reflection-corrected image within the meaning of the invention is an image which was corrected in terms of the reflections which occurred when recording the illumination pattern images.

Here, calculating a reflection-corrected image of the object by means of combining at least one illumination pattern image and at least one partial reflection image within the meaning of the invention can be a process which corrects the reflections created in the relevant illumination pattern images as a result of the illumination by the corresponding illumination patterns by virtue of suitably combining corresponding partial reflection images with the corresponding illumination pattern images. Here, the calculated partial reflections need to be introduced correctly into the reflection-corrected overall image by calculation—i.e., the calculation formula is dependent on the calculation of the partial reflection images. By way of example, this can be carried out by virtue of the corresponding illumination pattern images being added together and the added corresponding partial reflection images being subtracted therefrom. In developments of the method according to the invention, only portions could be added too or additional image-processing steps could be interposed, should this be desired and necessary.

Here, an active illumination source within the meaning of the invention can be a light source which is switched on in order to illuminate the object, e.g. an individual LED or a group of LEDs in an LED ring light.

Therefore, an angle-selective illumination of the object can be achieved by arranging a plurality of such illumination sources around the object and by the targeted actuation thereof.

An advantage obtained by the teaching according to the invention is that a well-illuminated image recording can be generated for the object, in which reflections occurring due to the illumination can be eliminated to the greatest possible extent or completely eliminated. This can be achieved in a cost-effective manner, wherein the object can be displayed in a manner un-falsified to the greatest possible extent or completely un-falsified. As a result of this, well-illuminated object images which are reflection-free to the greatest possible extent can be generated, particularly in the case of magnified recordings as are created in microscopy.

The subject matter of a coordinate claim relates to a reflection-correcting device for reflection-corrected object imaging, preferably for reflection-corrected microscopy, particularly preferably for reflection-corrected light microscopy.

Here, the reflection-correcting device comprises: an image-recording device and a reflection correction device. Here, the image-recording device is configured to acquire an object image and transfer the latter to the reflection correction device. Here, the reflection-correcting device is configured to carry out a reflection correction method according to the invention, preferably with means from hardware or software image processing.

Here, an image-recording device within the meaning of the invention can be a device suitable for scanning an object and depicting the latter optically. In particular, an image-recording device can be a microscope, particularly preferably a light microscope with digital image acquisition. Furthermore, the image-recording device can have a plurality of illumination sources for the angle-selective illumination of the object to be recorded.

Here, a reflection correction device within the meaning of the invention can have a device configured to correct reflections created by the illumination of the object during the image recording. To this end, the reflection correction device can have a CPU and an associated architecture. In particular, the reflection correction device can be a correspondingly configured computer or an image-processing unit of a digital microscope.

An advantage obtained by the teaching according to the invention is that it is possible to provide a device in a cost-effective manner, said device rendering it possible to illuminate an object in an angle-selective manner, record the latter in the process and eliminate to the greatest possible extent or completely eliminate bothersome reflections created by the illuminating.

The subject matter of a further coordinate claim relates to a computer program product for a reflection-correcting device according to the invention, which is operable according to a reflection correction method according to the invention. An advantage obtained by the teaching according to the invention is that the reflection correction method is operable in an automated manner therewith and the latter can be provided for corresponding different devices according to the invention in a simple and cost-effective manner.

Here, the subject matter of a further coordinate claim relates to a data medium comprising a computer program product according to the invention.

An advantage obtained by the teaching according to the invention is that the reflection correction method is operable in an automated manner therewith and the latter can be provided for corresponding different devices according to the invention in a simple and cost-effective manner and the latter can easily be transported in order to be able to port the method directly to the corresponding device according to the invention, at the site of the device.

Before embodiments of the invention are described in more detail below, it should be noted initially that the invention is not restricted to the described components or the described method steps. Furthermore, the employed terminology also does not constitute a restriction but merely has an exemplary character. To the extent that the singular is used in the description and the claims, this also comprises the plural in each case to the extent that this is not explicitly precluded by the context. To the extent that this is not explicitly precluded by the context, possible method steps can be carried out in an automated manner.

Further exemplary embodiments of the method according to the invention are explained below.

In accordance with a first exemplary embodiment, the reflection correction method further comprises the active illumination sources of all illumination patterns forming a geometric basic structure around the object. And the illumination patterns have a pattern, said pattern being selectable from a pattern group.

Here, the pattern group comprises:
a single active illumination source;
a plurality of active illumination sources in the form of an eighth of the geometric basic structure;
a plurality of active illumination sources in the form of a quarter of the geometric basic structure;
a plurality of active illumination sources in the form of half of the geometric basic structure;
and, furthermore, every second illumination source of the geometric basic structure as active illumination source.

Here, a geometric basic structure within the meaning of the invention can be an arrangement of the illumination sources in order to achieve a correspondingly good illumination of the object to be recorded. Preferably, the geometric basic structure can be a circle structure or a circle-like structure; however, it can also be a quadrilateral or a polygon. Different ring illuminations can be used here.

An advantage of this embodiment is that it is possible to select illumination patterns which can enable an ideal illumination of the object, and in the case of which it is possible to take care that reflections which can be corrected as easily as possible are created.

In accordance with a further exemplary embodiment, the reflection correction method furthermore comprises the following steps:
forming a suitable first illumination group and a suitable further illumination group, assigning each illumination pattern image to the first illumination group or to the further illumination group.

Here, the respectively two illumination pattern images for determining the corresponding partial reflection image belong to different illumination groups.

Here, an illumination group within the meaning of the invention can be a group which can receive some of the illumination patterns. Hence, the illumination patterns can be sorted into groups in order to be able to create corresponding partial reflection images.

An advantage of this embodiment is that partial reflection images can be created in an effective manner in such a way that reflections created by the angle-selective illuminations can be highlighted.

In accordance with a further exemplary embodiment, the reflection correction method furthermore comprises the number of partial reflection images corresponding to the number of illumination patterns of the first illumination group and/or the number of illumination patterns of the further illumination group.

An advantage of this embodiment is that it is only necessary to generate so many partial reflection images as are necessary to highlight the occurring reflections as a result of the angle-selective illumination or as a result of the illumination patterns in order thereafter to filter these reflections out of the object image or the object images.

In accordance with a further exemplary embodiment, the reflection correction method furthermore comprises each partial reflection image corresponding to a difference image of the corresponding two illumination pattern images.

Here, a difference image within the meaning of the invention can be an image which is created when two images are subtracted from one another, for example pixel-by-pixel. In so doing, pixels that are identical are eliminated. In this way, only those image portions which were created by an angular selectivity of the illumination remain in the case of a static object, that is to say the reflections for the corresponding illumination pattern or two mutually similar illumination patterns.

An advantage of this embodiment is that it is possible, in a simple manner, to generate images only containing the reflections to the greatest possible extent in order subsequently to be able to filter said reflections from the corresponding object image.

In accordance with a further exemplary embodiment, the reflection correction method furthermore comprises the difference image having an absolute value difference image, preferably a weighted absolute value difference image.

Here, an absolute value difference image within the meaning of the invention can be an image where which one of the two images was subtracted from the other one plays no role in the difference images of the pixels since the absolute value is formed during the subtraction, the respective result therefore always has a positive value. Here, a weighted absolute value difference image within the meaning of the invention can be an absolute value image which is normalized, for example to a certain brightness.

An advantage of this embodiment is that the method can be made flexible since, during the generation of a partial reflection image, there is no need to preselect which one of the two corresponding illumination pattern images needs to be subtracted from the other one.

In accordance with a further exemplary embodiment, the reflection correction method furthermore comprises determining a suitable adjacency relationship of the illumination pattern images in relation to one another. Here, the first illumination group and the further illumination group are formed by means of the adjacency relationship. The respective illumination pattern image is assigned to the first illumination group or to the further illumination group on the basis of the adjacency relationship.

Here, an adjacency relationship of the illumination pattern images in relation to one another within the meaning of the invention can have as a basis a similar angle selectivity of the illumination by the two corresponding illumination patterns. Here, the adjacency can be a closeness due to a reference axis. The adjacency can also be given by a direct closeness of two illumination sources which are used in a different one of the illumination patterns in each case.

An advantage of this embodiment is that it is possible to use illumination pattern images for forming a partial reflection image, in which illumination pattern images the reflections have similar angle selectivity as a result of the adjacency of the illumination pattern images and therefore generate largely similar reflections in the associated illumination pattern images.

In accordance with a further exemplary embodiment, the reflection correction method furthermore comprises the adjacency relationship being determined in a manner dependent on the selected pattern.

An advantage of this embodiment is that it is possible to use illumination pattern images for forming a partial reflection image, in which illumination pattern images the reflections have similar angle selectivity as a result of the adjacency of the illumination patterns and therefore generate largely similar reflections in the associated illumination pattern images.

In accordance with a further exemplary embodiment, the reflection correction method furthermore comprises establishing an overall reflection image from at least some of the partial reflection images.

Preferably, this can take place by means of all partial reflection images.

Here, an overall reflection image within the meaning of the invention can be an image in which all corresponding partial reflection images are combined to form an overall image. Therefore, all reflections which were created by the angle-selective recordings are combined in an image, and so an image in which merely virtually all reflections of the object are contained is created.

An advantage of this embodiment is that the reflections can be filtered from the object in a simple and efficient manner.

In accordance with a further exemplary embodiment, the reflection correction method furthermore comprises the overall reflection image being established by means of suitably superposing the corresponding partial reflection images over one another. Particularly preferably, the suitable superposition is carried out by means of summing the corresponding partial reflection images.

An advantage of this embodiment is that all reflections of the object can be depicted in an image in a simple and efficient manner.

In accordance with a further exemplary embodiment, the construction of the reflection-corrected image of the object for the reflection correction method comprises:
  summing at least some of all illumination pattern images, preferably all illumination pattern images, to form an overall illumination pattern image,
  subtracting the overall reflection image from the overall illumination pattern image to form an overall image, and
  suitably normalizing the overall image.

Here, the result of the normalization of the overall image corresponds to the reflection-corrected image of the object.

Here, an overall illumination pattern image within the meaning of the invention can be an image in which all corresponding illumination pattern images are combined to form an overall image. Hence, the information about the object from all illumination directions is depicted in one image. Therefore, all information, including all reflections created by the angle-selective recordings, can be contained in this image.

An advantage of this embodiment is that an image is created thus, from which all reflections created by the angle-selective illumination can be filtered out in a simple and efficient manner.

In accordance with a further exemplary embodiment the object for the reflection correction method comprises it being a diffusely reflecting object.

An advantage of this embodiment is that the method is applicable to objects which do not have any explicit preferential directions for the reflection.

The invention therefore renders it possible to provide a method and associated devices, as a result of which it is rendered possible to provide an ideal illumination of an object for the purposes of optically acquiring the object and, in the process, optically depicting the object without reflections created by the illumination to the greatest possible extent.

Now, the reflection-corrected image is calculated as follows:

$$\text{Image} = \frac{\sum_{i=1}^{n} I_i - \frac{\sum_{j \in N(i)} |I_i - I_j|}{m}}{n},$$

where N(i) is the set of illumination directions directly adjacent to i and m specifies the number of all adjacent illumination directions N(i).

In some illumination settings, multiple possible neighboring illumination directions of a single illumination need to be considered. In the case of illumination grids, the concept of pixel connectivity might give an appropriate neighborhood definition. But even more general neighborhoods are possible. Consequently, we denote the indices of neighbors of an illumination direction i with N(i).

By #N(i), the number of neighbors of direction i is indicated. More general, # counts the element of the subsequently described discrete set. E.G. sum_over i: #(N(i)=j) is the number of directions where j is a neighbor.

Following this notation, we may generalize the formula for the reflex correction into $$\text{Image} = \frac{\sum_{i=1}^{M} \left( \#N(i) + \sum_{j=1}^{M} \#\{N(j) = i\} \right) \times I_i - \sum_{i=1}^{M} \sum_{j \in N(i)} |I_i - I_j|}{\sum_{i=1}^{M} \left( \#N(i) + \sum_{j=1}^{M} \#\{N(j) = i\} \right)}$$

It has to be noted, that no illumination direction can be a neighbor of itself and there have to be at least one illumination direction that has a well-defined neighboring illumination direction.

Alternatively, the reflections can incidentally be reduced (not removed), by virtue of an image averaging being carried out:

$$\text{Image} = \frac{\sum_{i=1}^{n} I_i}{n}.$$

Moreover, the adjacency need not necessarily be direct adjacency, or it need not be complete for all individual directions and, in general, it need not be symmetrical either. However, then the number m for each i needs to be adapted.

The invention will be explained more in depth below on the basis of the figures. In the latter:

Figure 1:
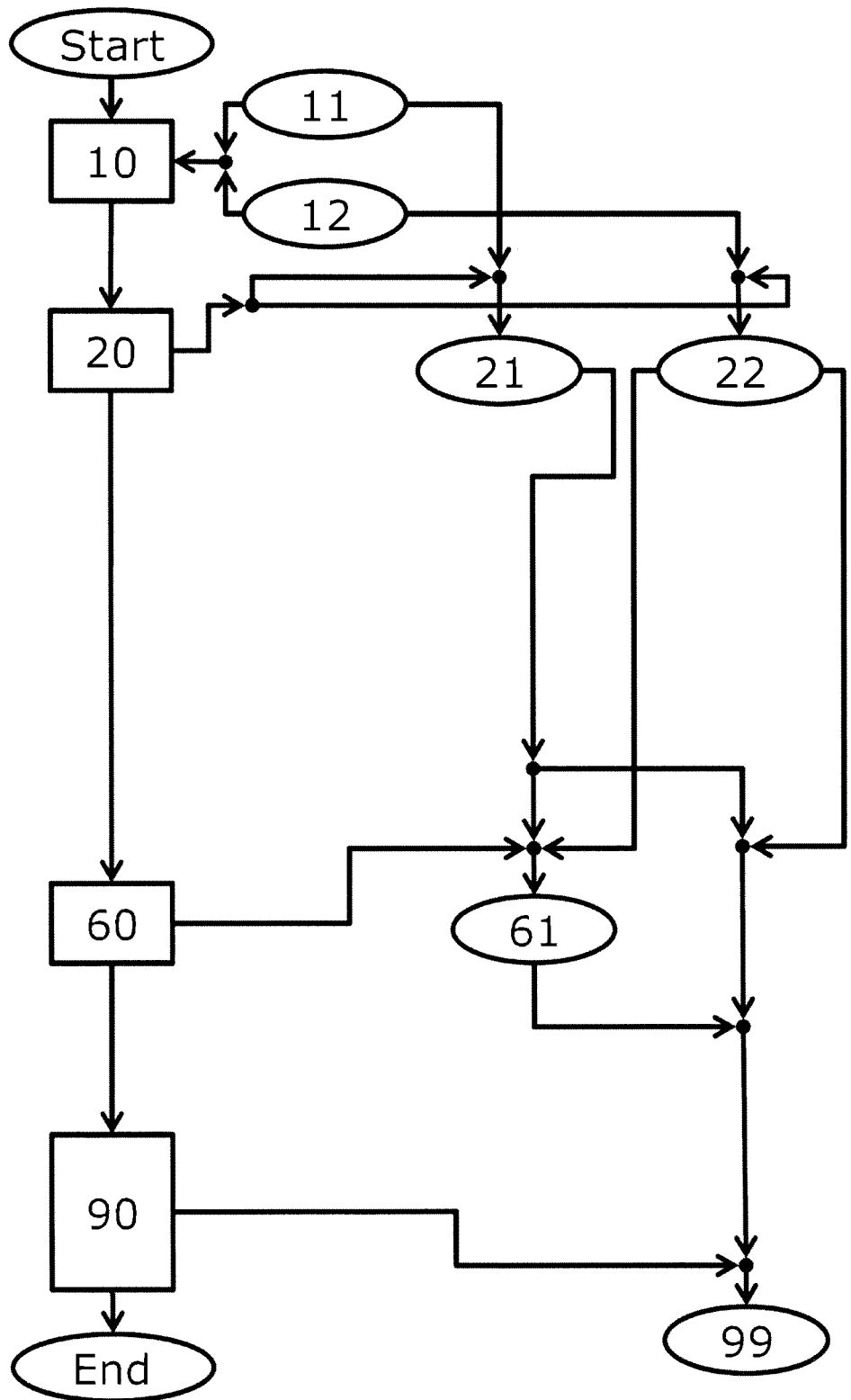
FIG. 1 shows a schematic illustration of a proposed method in accordance with an exemplary embodiment of the invention.

Here, FIG. 1 shows a schematic illustration of a reflection correction method for correcting images, preferably microscopic images. Here, the reflection correction method comprises: illuminating 10 an object, wherein the illuminating 10 of the object has at least two illumination patterns, 11, 12. Creating 20 an illumination pattern image 21, 22 of the object for each illumination pattern 11, 12. Determining 60 a number of partial reflection images 61, in each case by means of a suitable combination of corresponding two illumination pattern images 21, 22. Constructing 90 a reflection-corrected image 99 of the object by means of a suitable combination of at least some of all illumination pattern images 21, 22 and at least some of all partial reflection images 61. And, in the process, each illumination pattern 11, 12 has at least one active illumination source 111, and each illumination pattern 11, 12 is different from all others.

Figure 2:
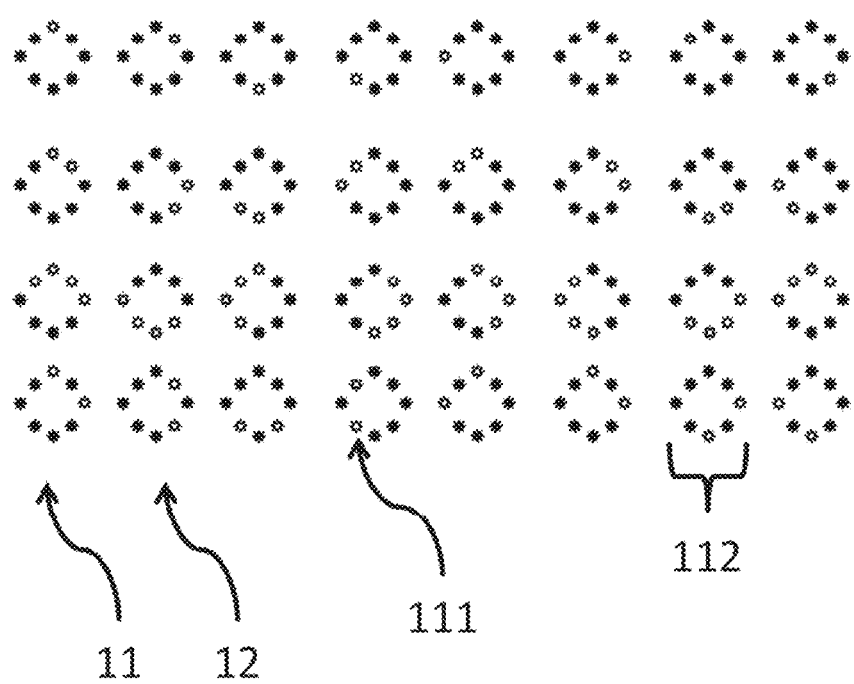
FIG. 2 shows a schematic illustration of some exemplary illumination patterns for a circular geometric basic structure for a proposed method in accordance with a further exemplary embodiment of the invention.

FIG. 2 shows a schematic illustration of some exemplary illumination patterns for a circular geometric basic structure for a proposed method in accordance with a further exemplary embodiment of the invention. Here, FIG. 2 shows four rows of different illumination patterns. Here, the active illumination sources 111 of all illumination patterns 11, 12 form a geometric basic structure 112 around the object in each row. The illumination patterns 11, 12 have a pattern, wherein the pattern is selectable from a pattern group, wherein the pattern group comprises: a single active illumination source 111, as depicted in an exemplary manner in row one. A plurality of active illumination sources 111 in the form of an eighth of the geometric basic structure 112. Since the geometric figure has eight illumination sources 111 in the example of FIG. 2, row one likewise corresponds to this pattern. A plurality of active illumination sources 111 in the form of a quarter of the geometric basic structure 112, as depicted in an exemplary manner in row two. A plurality of active illumination sources 111 in the form of half of the geometric basic structure 112, as depicted in an exemplary manner in row three. And every second illumination source 111 of the geometric basic structure 112 as an active illumination source 111, as depicted in an exemplary manner in row four.

Figure 3:
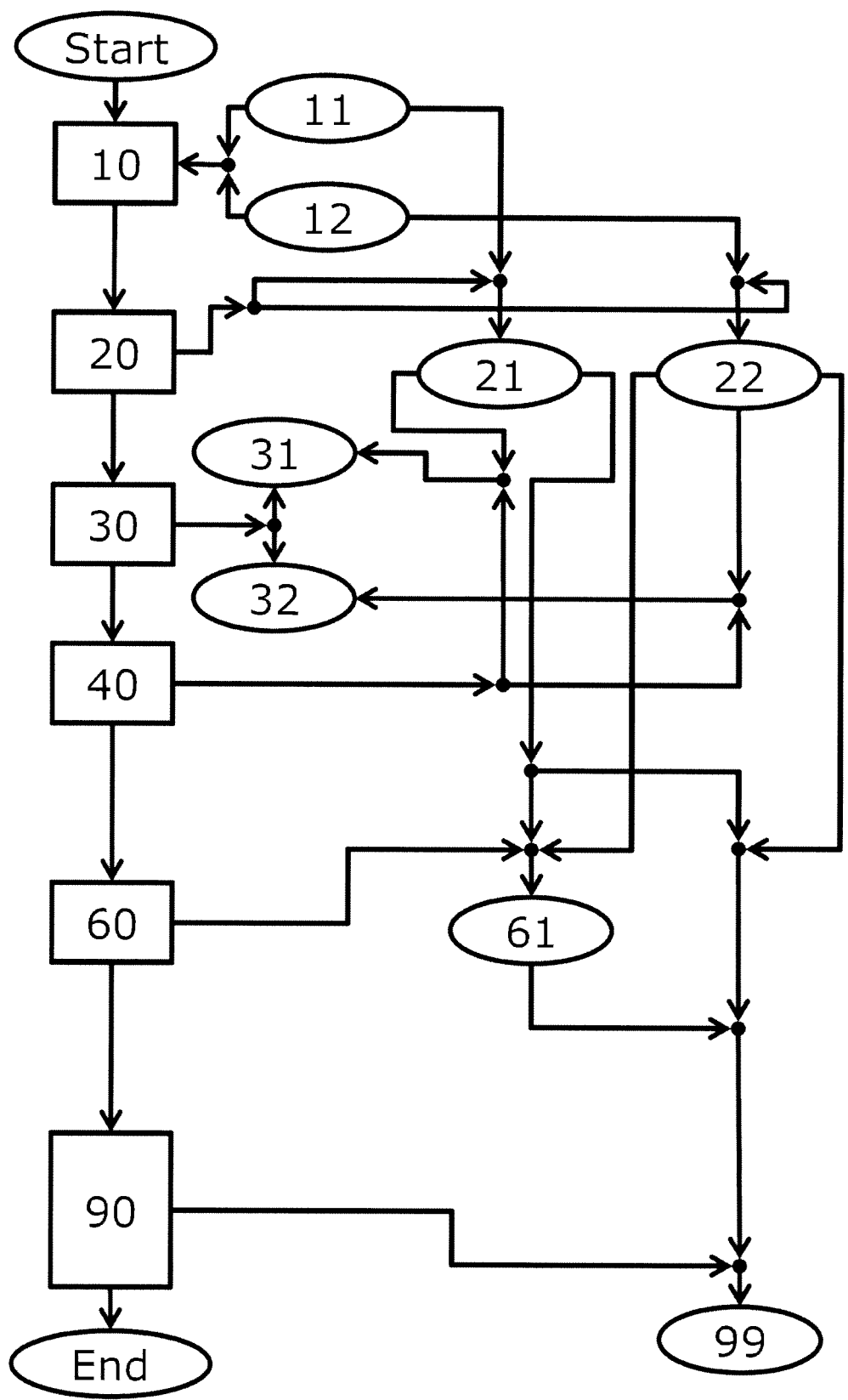
FIG. 3 shows a schematic illustration of a proposed method in accordance with a further exemplary embodiment of the invention.

FIG. 3 shows a schematic illustration of a proposed method in accordance with a further exemplary embodiment of the invention.

Here, FIG. 3 shows a schematic illustration of a method that has been extended in relation to the method from FIG. 1. What was stated above in relation to FIG. 1 correspondingly applies to FIG. 3.

As can be gathered from FIG. 3, the reflection correction method furthermore comprises: forming 30 a suitable first illumination group 31 and a suitable further illumination group 32. Assigning 40 each illumination pattern image 21, 22 to the first illumination group 31 or to the further illumination group 32. And, in so doing, the respectively two illumination pattern images 21, 22 for determining 60 the corresponding partial reflection image 61 belong to different illumination groups 31, 32.

Figure 4:
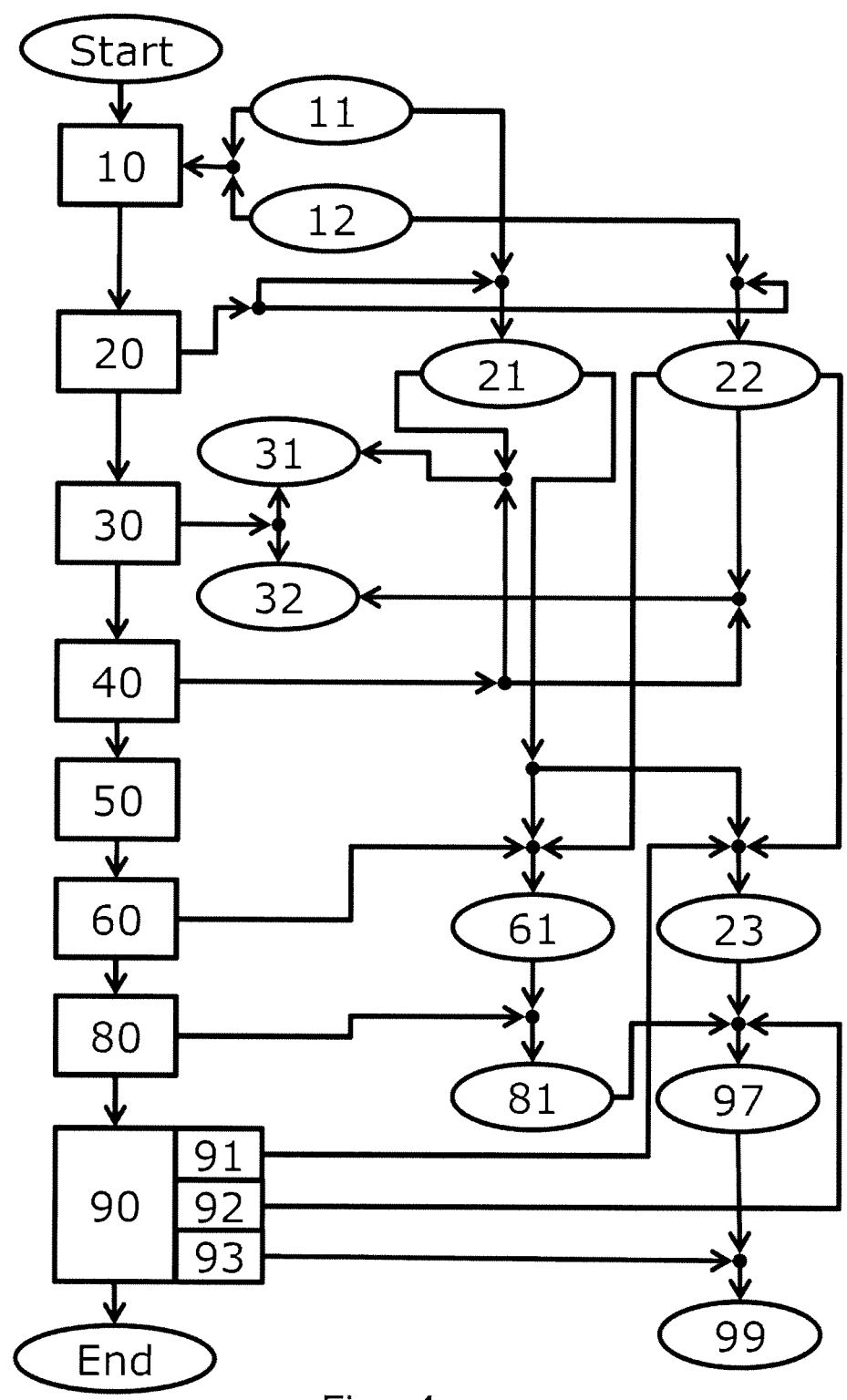
FIG. 4 shows a schematic illustration of a proposed method in accordance with a further exemplary embodiment of the invention.

FIG. 4 shows a schematic illustration of a proposed method in accordance with a further exemplary embodiment of the invention.

Here, FIG. 4 shows a schematic illustration of a method that has been extended in relation to the method from FIG. 1 and FIG. 3. What was stated above in relation to FIG. 1 and FIG. 3 correspondingly applies to FIG. 4.

As can be gathered from FIG. 4, the reflection correction method moreover comprises determining 50 a suitable adjacency relationship of the illumination pattern images 21, 22 in relation to one another. Here, the first illumination group 31 and the further illumination group 32 are formed 30 by means of the adjacency relationship. And the respective illumination pattern image 21, 22 is assigned to the first illumination group 31 or to the further illumination group 32 on the basis of the adjacency relationship. Furthermore, the adjacency relationship is determined 50 in a manner dependent on the selected pattern.

Moreover, the reflection correction method furthermore comprises establishing 80 an overall reflection image 81 from at least some of the partial reflection images 61. Here, the overall reflection image 81 is established 80 by means of suitably superposing the corresponding partial reflection images 61 over one another, particularly preferably by means of summing the corresponding partial reflection images 61.

Furthermore, constructing 90 the reflection-corrected image 99 of the object for the reflection correction method comprises: summing 91 at least some of all illumination pattern images 21, 22, preferably all illumination pattern images 21, 22, to form an overall illumination pattern image 23. Subtracting 92 the overall reflection image 81 from the overall illumination pattern image 23 to form an overall image 97. And suitably normalizing 93 the overall image 97. Here, the result of the normalization 93 of the overall image 97 corresponds to the reflection-corrected image 99 of the object.

Figure 5:
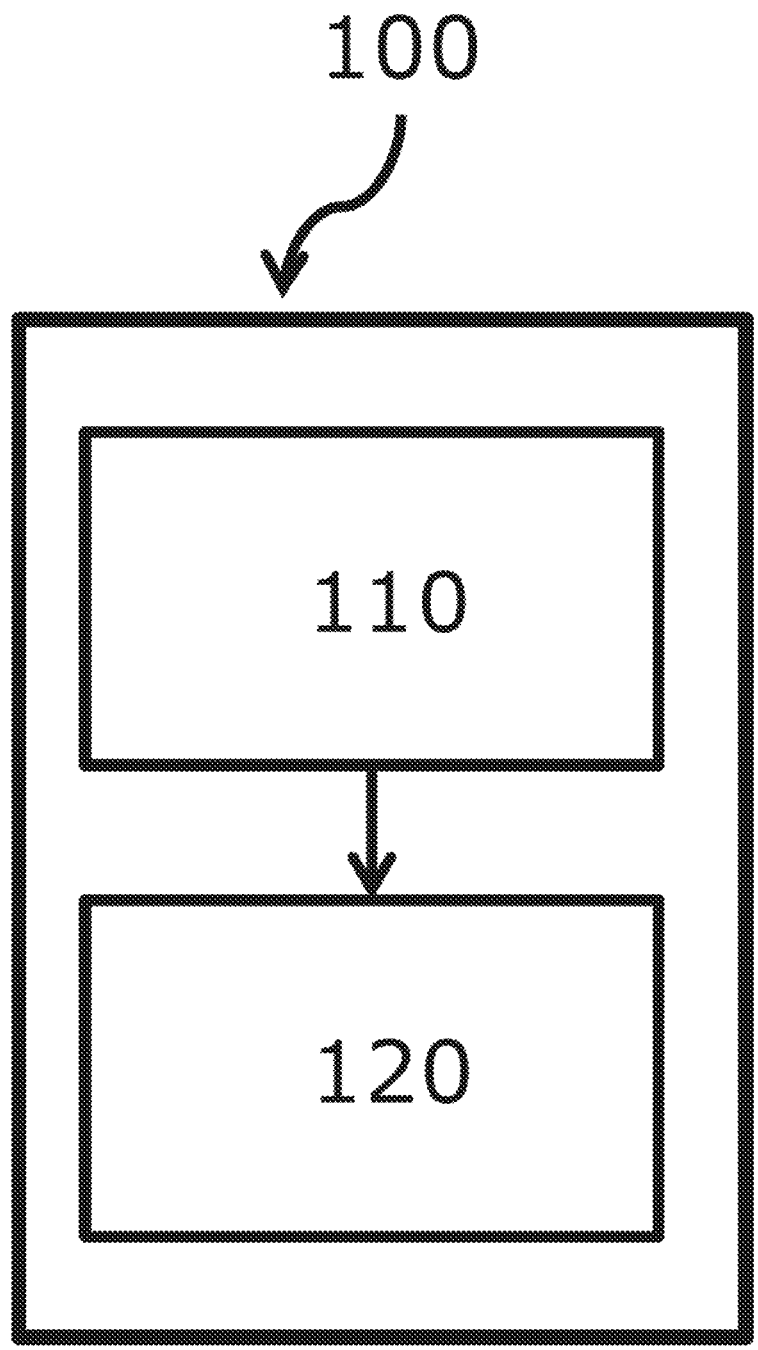
FIG. 5 shows a schematic illustration of a proposed device in accordance with a further exemplary embodiment of the invention.

FIG. 5 shows a schematic illustration of a proposed device in accordance with a further exemplary embodiment of the invention.

Here, FIG. 5 shows a schematic illustration of a reflection-correcting device 100 for reflection-corrected object imaging, preferably for reflection-corrected microscopy, particularly preferably for reflection-corrected light microscopy. The reflection-correcting device 100 comprises an image-recording device 110 and a reflection correction device 120. Here, the image-recording device 110 is configured to record or acquire an object and transfer a result (image) to the reflection correction device 120. And the reflection-correcting device 100 is furthermore configured to carry out a reflection correction method according to the invention.

The concept of the invention can be summarized as outlined below. A method and corresponding devices are provided, as a result of which it can become possible to acquire an object optically and, in the process, correct reflections which are created by the illumination when recording the object. The underlying principle is that images of adjacent illumination directions always show similar images of the object, with the reflections generally being strongly dependent upon the illumination direction. As a result, the reflections remain when forming the differences of the recorded images. Subsequently, the reflections are normalized in such a way by forming the absolute value, the sum and the normalization that they can be directly subtracted from a sum of the individual images. The resultant image subsequently contains no more direct reflections to the greatest possible extent.

Since this method is non-parametric, there is no creation of unnatural artefacts either, as may occur in current practical embodiments. Furthermore, the illumination direction-dependent reflections are removed, independently of what intensity they may have.

LIST OF REFERENCE SIGNS

10 Illuminating the object
11, 12 Illumination pattern
20 Creating an illumination pattern image
21, 22 Illumination pattern image
23 Overall illumination pattern image
30 Forming a first and second illumination group
31 First illumination group
32 Second illumination group
40 Assigning each illumination pattern image to an illumination group
50 Determining an adjacency relationship of the illumination pattern images with respect to one another
60 Calculating at least one partial reflection image
61 Partial reflection image
80 Establishing an overall reflection image
81 Overall reflection image
90 Calculating a reflection-corrected image
91 Summing at least some of all illumination pattern images to form an overall illumination pattern image
92 Subtracting the overall reflection image from the overall illumination pattern image to form an overall image
93 Normalizing the overall image
97 Overall image
99 Reflection-corrected image
100 Reflection-correcting device
110 Image-recording device
111 Illumination source
112 Geometric basic structure
120 Reflection correction device

The invention claimed is:

1. A reflection correction method for correcting digital microscopic images, comprising the following steps:

illuminating an object with at least three different illumination patterns, each illumination pattern is defined by two or more illumination sources arranged in a matrix, creating an illumination pattern image of the object for each illumination pattern, calculating at least two partial reflection images by combining two illumination pattern images, wherein each partial reflection image corresponds to an absolute value difference image of two neighbored illumination pattern images, establishing an overall reflection image from at least some of the partial reflection images, calculating a reflection-corrected image of the object by summing at least some of all the illumination pattern images to form an overall illumination pattern image and subtracting the overall reflection image from the overall illumination pattern image to form an overall image, and normalizing the overall image, the result of the normalization of the overall image corresponding to the reflection-corrected image of the object, wherein the two or more illumination sources form a geometric basic structure around the object and the illumination pattern is arranged such that every second illumination source of the geometric basic structure is an active illumination source.

2. The reflection correction method according to claim 1, wherein the two or more illumination sources form a geometric basic structure around the object and the illumination pattern has a pattern selectable from one of the following pattern groups:

a plurality of active illumination sources in the form of an eighth of the geometric basic structure, a plurality of active illumination sources in the form of a quarter of the geometric basic structure, and a plurality of active illumination sources in the form of half of the geometric basic structure.

3. The reflection correction method according to claim 1, furthermore comprising the following steps:

forming a first illumination group and a further illumination group, assigning each illumination pattern image to the first illumination group or to the further illumination group, wherein the respectively two illumination pattern images for determining the corresponding partial reflection image belong to different illumination groups.

4. The reflection correction method according to claim 3, wherein the number of partial reflection images corresponds to the number of illumination patterns of the first illumination group and/or the number of illumination patterns of the further illumination group.

5. The reflection correction method according to claim 1, wherein the absolute value difference image comprises a weighted absolute value difference image.

6. The reflection correction method according to claim 3, furthermore comprising:

determining an adjacency relationship of the illumination pattern images in relation to one another, wherein the first illumination group and the further illumination group are formed by means of the adjacency relationship and the respective illumination image is assigned to the first illumination group or to the further illumination group on the basis of the adjacency relationship.

7. The reflection correction method according to claim 6, wherein the adjacency relationship is determined in a manner dependent on the selected pattern.

8. The reflection correction method according to claim 1, wherein the overall reflection image is established by means of superposing the corresponding partial reflection images over one another, particularly preferably by means of summing the corresponding partial reflection images.

9. The reflection correction method according to claim 1, wherein the object is a diffusely reflecting object.

10. A device for reflection-corrected object imaging, preferably for reflection-corrected microscopy, particularly preferably for reflection-corrected light microscopy, comprising:

an image-recording device and a reflection correction device, wherein the image-recording device is configured to acquire an object image and transfer the latter to the reflection correction device, and wherein the reflection-correcting device is configured to carry out a reflection correction method according to claim 1.

11. A non-transitory computer program product for a reflection-correcting device according to claim 10, which is operable according to a reflection correction method according to claim 1.

12. Non-transitory data medium comprising the computer program product according to claim 11.

* * * * *